United States Patent
Miwa et al.

[11] Patent Number: 5,601,008
[45] Date of Patent: Feb. 11, 1997

[54] VACUUM SERVO UNIT FOR A VEHICLE BRAKING SYSTEM

[75] Inventors: Akihiko Miwa; Yuzuru Sugiura, both of Anjo; Shigeru Sakamoto, Susono, all of Japan

[73] Assignees: Aisin Seiki Kabushiki Kaisha, Kariya; Toyota Jidosha Kabushiki Kaisha, Toyota, both of Japan

[21] Appl. No.: 450,235

[22] Filed: May 25, 1995

[30] Foreign Application Priority Data

May 25, 1994 [JP] Japan .................................. 6-111383

[51] Int. Cl.⁶ .................................................. B60T 13/57
[52] U.S. Cl. .................................. 91/376 R; 91/369.2
[58] Field of Search .......................... 91/369.1, 369.2, 91/369.3, 369.4, 376 R

[56] References Cited

U.S. PATENT DOCUMENTS

| | | | |
|---|---|---|---|
| 4,598,625 | 7/1986 | Belart . | |
| 4,633,760 | 1/1987 | Wagner | 91/369.2 |
| 4,813,338 | 3/1989 | Mortimer et al. | 91/369.2 |
| 4,898,073 | 2/1990 | Seip et al. | 91/369.2 |
| 4,970,940 | 11/1990 | Boehm et al. | 91/369.2 |
| 5,014,597 | 5/1991 | Rueffer et al. | 91/369.2 |
| 5,115,718 | 5/1992 | Gautier et al. | 91/369.2 |
| 5,323,685 | 6/1994 | Wagner | 91/376 R |
| 5,493,946 | 2/1996 | Schluter | 91/376 R X |

FOREIGN PATENT DOCUMENTS

| | | |
|---|---|---|
| 60-188605 | 9/1985 | Japan . |
| 2-99061 | 8/1990 | Japan . |
| 4-113966 | 4/1992 | Japan .................. 91/376 R |
| 1515939 | 6/1978 | United Kingdom . |
| 2060100 | 4/1981 | United Kingdom . |
| 2148427 | 5/1985 | United Kingdom . |

Primary Examiner—John E. Ryznic
Attorney, Agent, or Firm—Burns, Doane, Swecker & Mathis, LLP

[57] ABSTRACT

The present invention is directed to a vacuum servo unit, wherein a variable pressure chamber is capable of communicating with the atmosphere through a clearance which is defined between an air valve member slidably mounted on an input member and a seal member provided in a cylindrical member, and wherein the variable pressure chamber is capable of communicating with a constant pressure chamber through a clearance which is defined between a vacuum valve member and a seal portion of a control valve member. Accordingly, when the air is introduced from the clearance between the air valve member and the seal member in the condition where the seal portion of the control valve member is in contact with the vacuum valve member, the control valve member is biased toward the vacuum valve member by the pressure difference between the negative pressure and the atmospheric pressure.

7 Claims, 3 Drawing Sheets

VACUUM SERVO UNIT FOR A VEHICLE BRAKING SYSTEM

BACKGROUND OF THE INVENTION

1. Field of the Invention

The present invention relates to a vacuum booster, i.e. vacuum servo unit for a vehicle braking system, and more particularly to a vacuum servo unit for reducing an operating input force to be applied when the unit is started to operate.

2. Description of the Prior Art

A conventional vacuum servo unit is disclosed in Japanese Utility Model Laid-open application No.2-99061, for example. The vacuum servo unit has a housing, which is separated by a movable wall member to define a constant pressure chamber and a variable pressure chamber. A cylindrical member extends from the central portion of the movable wall member out of the housing to receive an input member which includes a plunger and a rod. The plunger is slidably fitted into the cylindrical member in coaxial relationship therewith. The rod is connected to the plunger through a ball joint, and extends through the open end of the cylindrical member out of the cylindrical member. An air valve for controlling atmospheric air is formed on one end portion of the plunger at its side opposed to the open end of the cylindrical member. Also, a vacuum valve for controlling negative pressure is provided on the inner side of the cylindrical member, and placed at the outer side of the air valve so as to extend in the same direction as the air valve extends. Also provided is a control valve which has a cylindrical folding member, one end portion of which is provided with a seal portion opposed to the air valve and the vacuum valve, and the other end of which is air-tightly fixed to the inner side of the cylindrical member. A first compression coil spring is mounted between the seal portion of the control valve and the input member (or, the cylindrical member), to bias the seal portion toward the vacuum valve. A second compression coil spring is provided for biasing the input member against the cylindrical member to make the air valve contact the seal portion, and make the seal portion away from the vacuum valve, in its normal condition. A stopper is provided for limiting a displacement of the plunger biased by the second compression coil spring against the cylindrical member. A reaction mechanism is provided for applying a reaction force to the plunger in response to the advancing force applied to the movable wall member by the pressure difference between the constant pressure chamber and the variable pressure chamber. Then, the variable pressure chamber is adapted to communicate with the atmosphere through a clearance which is defined between the air valve and the seal portion, and the variable pressure chamber is adapted to communicate with the constant pressure chamber through a clearance which is defined between the vacuum valve and the seal portion.

In addition to the ordinary structure of the vacuum servo unit as described above, the unit disclosed in the publication has been proposed to function as follows. Namely, it is so arranged that an area of a pressure sensing surface, which biases the input member against the second compression coil spring when the seal portion of the control valve and the cylindrical folding portion are applied with a pressure difference between the negative pressure and the atmospheric pressure in the normal condition, is reduced by preventing a radially extending portion of the cylindrical folding portion at the other side thereof from communicating with the atmosphere. Whereby, reduced is an increase of operating resistance which is caused when a biasing force, which biases the input member in response to the pressure difference between the negative pressure and the atmospheric pressure when the unit is started to operate, is reduced by shifting a stage where the seal portion of the control valve contacts the vacuum valve, to another stage where the seal portion of the control valve comes to contact with the vacuum valve and where the air valve moves away from the seal portion of the control valve. Accordingly, the operating resistance force applied in accordance with a preload of the second compression coil spring and a preload of the first compression coil spring (the preload of the second compression coil spring, in the case where the first compression coil spring is mounted between the seal portion and the cylindrical member) is reduced to cause the operating input force to be small when the unit is started to operate.

According to the prior vacuum servo unit as described above, however, in the case where the diameter of the pressure sensing surface is made smaller than the diameter of the vacuum valve, when the servo unit operates, the air is introduced from the clearance between the seal portion and the air valve to cause a pressure difference between the atmospheric pressure and the negative pressure, by which the seal portion is biased to move away from the vacuum valve, so that the desired valve operation can not be obtained with the seal portion placed away from the vacuum valve.

In order to ensure the desired valve operation between the seal portion and the vacuum valve, therefore, the diameter of the pressure sensing surface has to be made larger by a necessary amount than the diameter of the vacuum valve. The biasing force, which is applied to the input member and caused by the pressure difference between the negative pressure and the atmospheric pressure when the unit is started to operate, is much reduced in accordance with the shift from the stage where the seal portion of the control valve comes to contact with the vacuum valve to the stage where the seal portion of the control valve contacts the vacuum valve and where the air valve moves away from the seal portion of the control valve. Therefore, the above-described vacuum servo unit is not so effective to reduce the operating input force when the unit is started to operate.

SUMMARY OF THE INVENTION

Accordingly, it is an object of the present invention to provide a vacuum servo unit which reduces the operating input force to be applied when the unit is started to operate.

In accomplishing the above and other objects, a vacuum servo unit for a vehicle braking system according to the present invention has a housing in which a pressure chamber is defined. A movable wall member is provided in the housing to divide the pressure chamber into at least a constant pressure chamber and a variable pressure chamber. A cylindrical member extends from the central portion of the movable wall member and its open end extends out of the housing to receive an input member. The input member includes a plunger which is slidably fitted into the cylindrical member in coaxial relationship therewith, and a rod which is connected to the plunger through a ball joint connection, and which extends through the open end of the cylindrical member out of the cylindrical member. A vacuum valve member is provided on the inner side of the cylindrical member, so that the vacuum valve member encompasses the input member and extends toward the open end of the cylindrical member. A seal member is provided on the inner side of the cylindrical member at a position closer to the open end than the vacuum valve member, so that the seal member is opposed to the vacuum valve member. Also provided is a control valve member which has a cylindrical folding member, one end portion of which is provided with a seal portion opposed to the vacuum valve member, and the other end of which is air-tightly fixed to the inner side of the cylindrical member. An air valve member is mounted on the input member opposite to the seal member which is provided on the inner side of the cylindrical member, in slidable and air-tight relationship with the input member. A first compression coil spring is provided between the air valve member and the seal portion of the control valve member. A first contact portion is provided on the input member to actuate the seal portion of the control valve member away from the vacuum valve member, and a second contact portion is provided on the input member to actuate the air valve member away from the seal member which is provided in the cylindrical member. In the cylindrical member, is provided a second compression coil spring which biases the input member to make the first contact portion contact the seal portion of the control valve member and actuate the seal portion away from the vacuum valve member in the normal condition. The second compression coil spring biases the input member to make the seal member contact the air valve member. A stopper is provided for limiting a displacement of the input member which is biased by the second compression coil spring against the cylindrical member. A third compression coil spring is provided between the plunger and the air valve member. A reaction disc is provided for applying a reaction force to the plunger in response to the advancing force applied to the movable wall member by the pressure difference between the pressure in the constant pressure chamber and the pressure in the variable pressure chamber. The variable pressure chamber is adapted to communicate with the atmosphere through a clearance which is defined between the air valve member and the seal member which is provided in the cylindrical member, and the variable pressure chamber is adapted to communicate with the constant pressure chamber through a clearance which is defined between the vacuum valve member and the seal portion of the control valve member.

Accordingly, when the air is introduced from the clearance between the air valve member and the seal member in the condition where the seal portion of the control valve member is in contact with the vacuum valve member, the control valve member is biased toward the vacuum valve member by the pressure difference between the negative pressure and the atmospheric pressure, so that the desired valve member operation is ensured between the vacuum valve member and the control valve member.

The air valve member may be mounted on the rod. In order to ensure a sealing property between the air valve member and the seal member in the cylindrical member, the air valve member may be mounted on the plunger.

According to the vacuum servo unit as structured above, therefore, the pressure difference between the negative pressure and the atmospheric pressure is not applied to the control valve member in the normal condition. When the unit is started to operate, the sum of the operating input force applied to the rod and the biasing force, which is caused by the pressure difference between the negative pressure and the atmospheric pressure and applied to the air valve member and the rod, i.e. the biasing force applied to the input member, prevails the load of the second compression coil spring to move the rod and the plunger connected thereto against the second compression coil spring, so that the seal portion of the control valve member contacts the vacuum valve member to block the communication between the variable pressure chamber and the constant pressure chamber. With the rod advanced further, the first contact portion of the rod contacts the air valve member to actuate the air valve member away from the seal member which is provided in the cylindrical member. Consequently, the variable chamber communicates with the atmosphere to introduce the air into the variable pressure chamber and increase the pressure therein. Whereby, the advancing force is applied to the movable wall member to advance the movable wall member and the pressure difference is applied to the control valve member. At this stage, the first compression coil spring biases against the operating input force. The rod and the plunger connected thereto are actuated to move, when the sum of the operating input force and the biasing force which is caused by the pressure difference and applied to the input member (i.e. the biasing force applied to the air valve member and the rod) exceeds the sum of the load of the second compression coil spring and the load of the first compression coil spring.

According to the present invention, the operating resistance which is caused at a stage where the seal portion of the control valve member contacts the vacuum valve member and the air valve member is away from the seal member, is slightly increased comparing with the operating resistance which is caused at a stage where the air valve member contacts the seal member and the seal portion of the control valve member is away from the vacuum valve member. However, the increased amount in this case corresponds to only the load of the first compression coil spring. With respect to the biasing force applied to the input member by the pressure difference between the negative pressure and the atmospheric pressure, the biasing force, which is caused at the stage where the air valve member contacts the seal member and where the seal portion of the control valve member is away from the vacuum valve member, is the same as the biasing force which is caused at the stage where the seal portion of the control valve member contacts the vacuum valve member and where the air valve member is away from the seal member. Thus, the operating input force, which is applied when the unit is started to operate, is largely reduced comparing with that of the prior vacuum servo unit.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
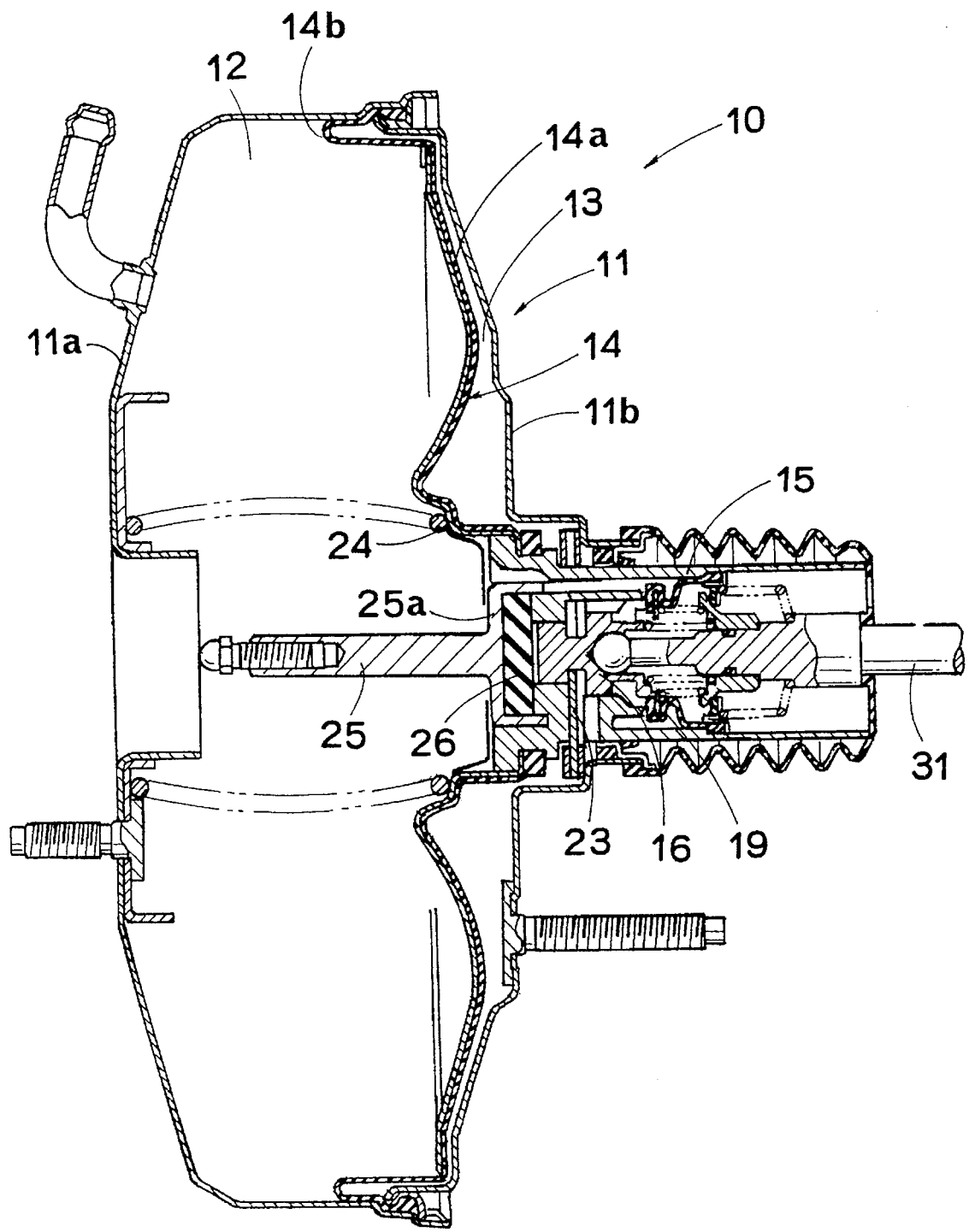
FIG. 1 is a sectional view of a vacuum servo unit according to a first embodiment of the present invention.
Figure 2:
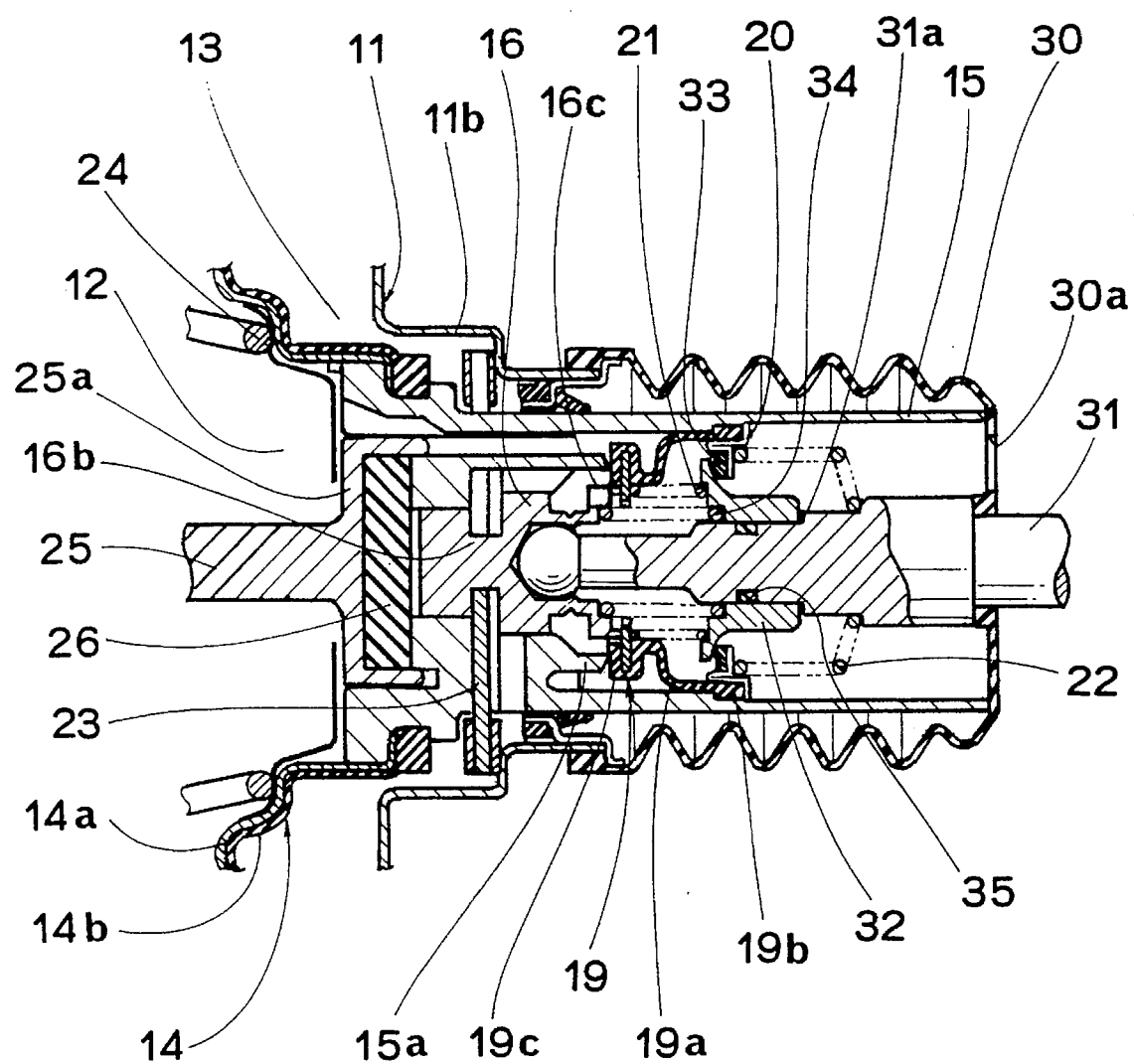
FIG. 2 is an enlarged sectional view of a part of a vacuum servo unit according to a first embodiment of the present invention.

Referring to FIGS. 1 and 2, there is illustrated a vacuum servo unit according to a first embodiment of the present invention. A vacuum servo unit 10 has a housing 11, which defines a pressure chamber between a front member 11a and a rear member 11b which is fitted into an opening of the front member 11a and secured thereto. The pressure chamber in the housing 11 is divided into a constant negative pressure chamber 12 (hereinafter, referred to as constant pressure chamber 12) at its front side and a variable pressure chamber 13 at its rear side, by means of a movable wall member 14 which has a pressure sensing ring plate 14a (hereinafter, referred to as a plate 14a) and a diaphragm 14b. The constant pressure chamber 12 is adapted to communicate with a vacuum source, such as an intake manifold of an internal combustion engine (not shown) or a vacuum pump (not shown). The plate 14a is connected at its inner peripheral portion to an outer peripheral portion of the front end of a cylindrical member 15, so as to be integrated therewith. The diaphragm 14b has an outer peripheral bead which is air-tightly clamped between the front member 11a and the rear member 11b of the housing 11, and an inner peripheral bead which is air-tightly fitted into a circular groove formed around an outer periphery of the cylindrical member 15.

The cylindrical member 15 extends rearward from a central portion of the movable wall member 14, and extends out of the housing 11 through its rear member 11b in air-tight and slidable relationship therewith. A plunger 16 is fitted into the cylindrical member 15 in coaxial and slidable relationship therewith. The plunger 16 is connected with the front end of a rod 31 through a ball joint to form an input member together with the rod 31. Disposed within the cylindrical member 15 is a control valve 19, which includes a cylindrical folding (extensible) portion 19a formed at its rear end with a bead portion 19b to be fixed air-tightly to the inner surface of the cylindrical member 15 by means of a retainer 20, and which includes a seal portion 19c formed at the front end of the cylindrical portion 19a. The seal portion 19c is opposed to a vacuum valve 15a which is formed in the cylindrical member 15 for controlling the negative pressure. The vacuum valve 15a is provided for controlling the negative pressure communicated from the constant pressure chamber 12 to the variable pressure chamber 13. On the rod 31, there is air-tightly and slidably mounted an air valve 32, which is opposed to a seal member 33 which is air-tightly fixed by the retainer 20, so as to control the air introduced into the variable pressure chamber 13 from the atmosphere. A contact portion 16c is formed at the rear end of the plunger 16 to move the seal portion 19c of the control valve 19 away from the vacuum valve 15a, and also a contact portion 31a is formed on the rod 31 to actuate the air valve 32 away from the seal member 33. A seal ring 35 is mounted on the rod 31 to keep the air-tight relationship between the rod 31 and the air valve 32 which slides on the rod 31.

A first compression coil spring 21 is provided between the air valve 32 and the seal portion 19c of the control valve 19, a second compression coil spring 22 is provided between the retainer 20 and the rod 31, and a third compression coil spring 34 is provided between the plunger 16 and the air valve 32. The sum of the biasing force (load) of the first compression coil spring 21 and the biasing force (load) of the third compression coil spring 34 is larger by a small amount than the pressure difference between the atmospheric pressure and the negative pressure applied to the air valve 32 in the leftward direction in FIG. 1, while the biasing force of the first compression coil spring 21 is much smaller than the biasing force of the third compression coil spring 34. With the biasing force (load) of the second compression coil spring 22, the air valve 32 is forced to contact the seal member 33, and the seal portion 19c of the control valve 19 is kept away from the vacuum valve 15a, against the pressure difference between the atmospheric pressure and the negative pressure applied to the air valve 32 and rod 31.

In order to limit the displacement of the plunger 16 relative to the cylindrical member 15 in the rearward direction, a key member 23 having a cutout portion, into which the small diameter portion 16b of the plunger 16 is fitted, is provided through the cylindrical member 15. The thickness of the key member 23 is designed to be smaller by a predetermined amount than the thickness of a hole defined in the cylindrical member 15 for inserting therein the key member 23, so that the key member 23 is capable of moving by the predetermined amount relative to the cylindrical member 15 in the axial direction of the plunger 16. In the condition where the key member 23 is placed at the rearmost side relative to the cylindrical member 15, the seal portion 19c of the control valve 19 is away from the vacuum valve 15a by the largest displacement, so that the air in the variable pressure chamber 13 can be discharged into the constant pressure chamber 12 immediately. The opposite ends of the key member 23 are arranged to extend out of the cylindrical member 15 so that they can abut on the inner surface of the housing 11. Therefore, the key member 23 functions as a stopper to provide a return position of the movable wall member 14. That is, it is so arranged that the rearward movement of the movable wall member 14 biased by means of the return spring 24 ends, when the cylindrical member 15 is blocked by the inner surface of the housing 11 with the key member 23 abut thereon. In the case where the movable wall member 14 is placed at its return position, the displacement between the vacuum valve 15a and the seal portion 19c of the control valve 19 is very small.

The output member 25 has at its rear end a cup-like portion 25a, which is slidably fitted into the cylindrical member 15 at the front end thereof, and within which a rubber disc 26 is received, so as to apply a reaction force, which is proportional to the advancing force of the movable wall member 14, to the plunger 16, as already known in the art. Between the housing 11 and the cylindrical member 15, there is disposed a boot 30 having a through hole 30a which is defined to communicate the rear open end of the cylindrical member 15 with the atmosphere.

In the case where the rod 31 has not been applied with the operating input force, i.e., in the normal condition, no advancing force has been applied to the movable wall member 14. In the normal condition as shown in FIGS. 1 and 2, the air valve 32 contacts the seal member 33, which is fixed to the cylindrical member 15, to block the air from flowing into the variable pressure chamber 13, and the seal portion 19c of the control valve 19 is placed away from the vacuum valve 15a by a small displacement to communicate the constant pressure chamber 12 with the variable pressure chamber 13, so that the variable pressure chamber 13 is under the same negative pressure as the constant pressure chamber 12. Therefore, the control valve 19 is applied with only the negative pressure.

In operation, the rod 31 is applied with the operating input force in response to depression of a brake pedal (not shown), for example. When the operating input force exceeds a difference between the force, which is exerted by the pressure difference between the atmospheric pressure and the negative pressure for biasing the air valve 32 and the rod 31 toward the front side, and the biasing force of the second compression coil spring 22, i.e., when the sum of the operating input force applied to the rod 31 and the biasing force for biasing the air valve 32 and rod 31 toward the front side in accordance with the pressure difference between the atmospheric pressure and the negative pressure, exceeds the biasing force of the second compression coil spring 22, then the rod 31 and the plunger 16 are forced to move toward the front side and the seal portion 19c of the control valve 19 follows them. Whereby, the seal portion 19c of the control valve 19 contacts the vacuum valve 15a to block the variable pressure chamber 13 from communicating with the constant pressure chamber 12, and the contact portion 31a of the rod 31 contacts the air valve 32 thereby to increase the operating input force by the amount of the biasing force of the first compression coil spring 21. Consequently, the air valve 32 is actuated away from the seal member 33 to introduce the air into the variable pressure chamber 13 through the through hole 30a of the boot 30 and the inside of the cylindrical member 15, so that the pressure in the variable pressure chamber 13 is increased. With the pressure in the variable pressure chamber 13 increased to be higher than the pressure in the constant pressure chamber 12, the advancing force is applied to the movable wall member 14, and transmitted to the output member 25 through the rubber disc 26 to move the movable wall member 14 and the cylindrical member 15 toward the front side.

When the advancing force of the movable wall member 14 reaches the predetermined value with the variable pressure chamber 13 increased, a portion of the rubber disc 26 opposed to the plunger 16 extends toward the plunger 16 to contact therewith, so that the rearward reaction force proportional to the advancing force of the movable wall member 14 is applied to the plunger 16. Under this condition, the plunger 16 is actuated to move in accordance with the difference between the operating input force and the reaction force applied by the rubber disc 26, so that the contacting condition between the seal portion 19c and the air valve 32 is controlled, and the contacting condition between the seal portion 19c and the vacuum valve 15a is controlled, so as to cancel the difference.

Figure 3:
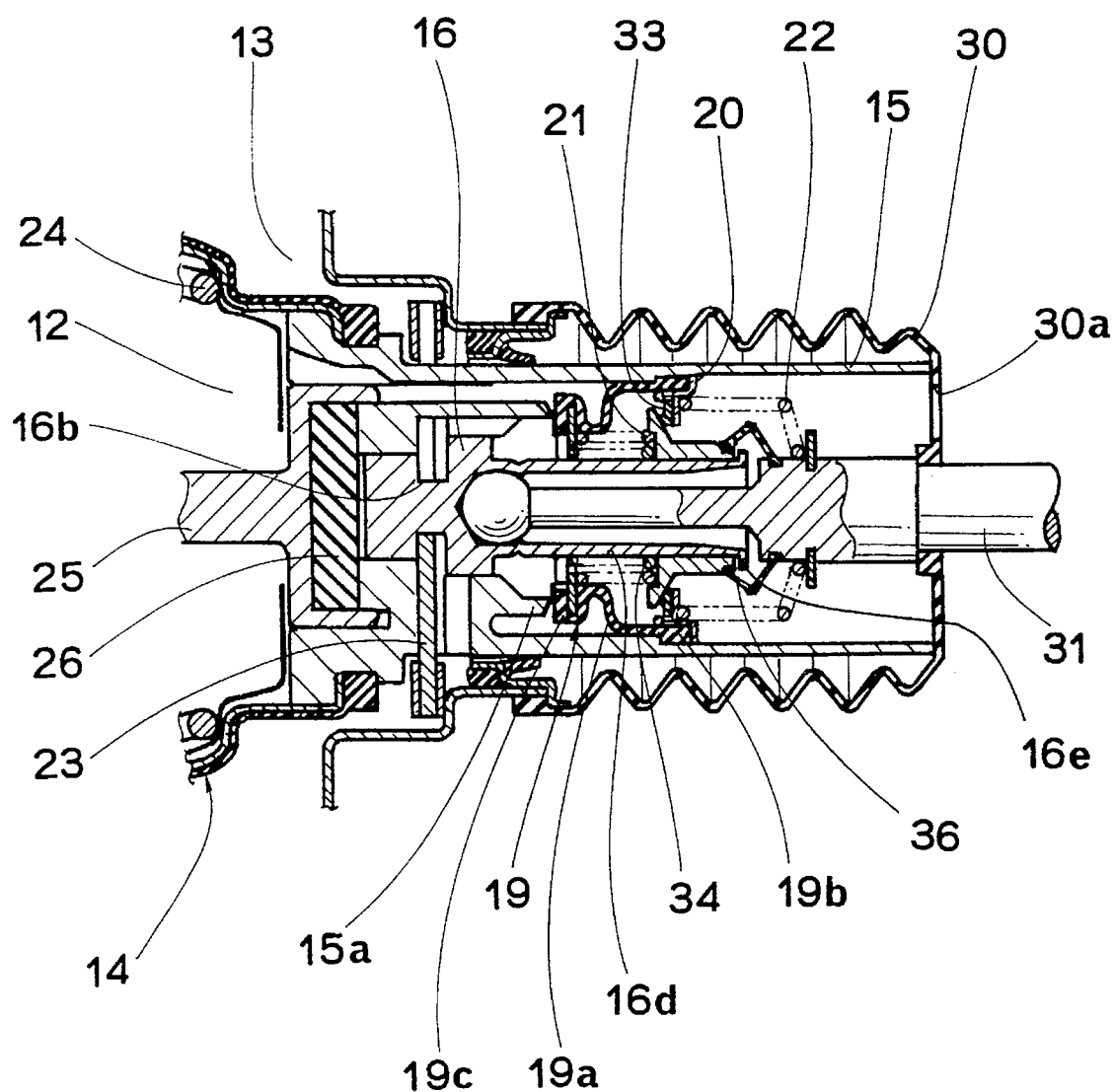
FIG. 3 is an enlarged sectional view of a part of a vacuum servo unit according to a second embodiment of the present invention.

FIG. 3 illustrates a second embodiment of the present invention, wherein the supporting structure of the air valve 32 is different from that in the first embodiment. The air valve 32 according to the second embodiment is slidably fitted into a cylindrical portion 16d, which is formed integrally with the plunger 16, to keep an air-tight relationship between the air valve 32 and the rod 31 with a boot 36 mounted therebetween. The cylindrical portion 16d is formed at its tip end with a contact portion 16e which actuates the air valve 32 away from the seal member 33. With the structure formed as in FIG. 3, even if the rod 31 was forced to swing about the connected point with the plunger 16, the air valve 32 would not swing. Therefore, it is advantageous to employ the structure in FIG. 3 to obtain a good sealing property between the air valve 32 and seal member 33.

It should be apparent to one skilled in the art that the above-described embodiments are merely illustrative of but two of the many possible specific embodiments of the present invention. Numerous and various other arrangements can be readily devised by those skilled in the art without departing from the spirit and scope of the invention as defined in the following claims.

What is claimed is:

1. A vacuum servo unit for a vehicle braking system comprising:

a housing defining therein a pressure chamber;

a movable wall member provided in said housing for dividing said pressure chamber into at least a constant pressure chamber and a variable pressure chamber;

a cylindrical member extending from a central portion of said movable wall member, and having an open end extending out of said housing;

an input member having a plunger slidably fitted into said cylindrical member in coaxial relationship therewith, and a rod connected to said plunger through a ball joint connection, said rod extending through the open end of said cylindrical member out of said cylindrical member;

a vacuum valve member provided on an inner side of said cylindrical member, said vacuum valve member encompassing said input member and extending toward the open end of said cylindrical member;

a seal member provided on the inner side of said cylindrical member at a position closer to the open end of said cylindrical member than said vacuum valve member, said seal member being opposed to said vacuum valve member;

a control valve member having a cylindrical folding member, one end portion thereof provided with a seal portion opposed to said vacuum valve member, and the other end of said folding member air-tightly fixed to the inner side of said cylindrical member;

an air valve member mounted on said input member opposite to said seal member in slidable and air-tight relationship with said input member;

a first compression coil spring provided between said air valve member and said seal portion of said control valve member;

a first contact portion provided on said input member for actuating said seal portion of said control valve member away from said vacuum valve member;

a second contact portion provided on said input member for actuating said air valve member away from said seal member;

a second compression coil spring provided in said cylindrical member for biasing said input member to make said first contact portion of said plunger contact said seal portion of said control valve member and actuate said seal portion away from said vacuum valve member in a normal condition, said second compression coil spring biasing said input member to make said air valve member contact said seal member;

means for limiting a displacement of said input member biased by said second compression coil spring against said cylindrical member;

a third compression coil spring provided between said plunger and said air valve member; and reaction means for applying a reaction force to said plunger in response to the advancing force applied to said movable wall member by the pressure difference between the pressure in said constant pressure chamber and the pressure in said variable pressure chamber; and said variable pressure chamber communicating with the atmosphere through a clearance defined between said air valve member and said seal member, and said variable pressure chamber communicating with said constant pressure chamber through a clearance defined between said vacuum valve member and said seal portion of said control valve member.

2. A vacuum servo unit as claimed in claim 1, wherein a retainer is fixed to said cylindrical member, and wherein said second compression coil spring is mounted between said retainer and said rod.

3. A vacuum servo unit as claimed in claim 2, wherein the biasing force of said second compression coil spring balances with the pressure difference between the atmospheric pressure and the negative pressure applied to said air valve member and said rod to keep said air valve member contact with said seal member and keep said seal portion of said control valve member away from said vacuum valve member.

4. A vacuum servo unit as claimed in claim 3, wherein the sum of the biasing force of said first compression coil spring and the biasing force of said third compression coil spring is larger than the pressure difference between the atmospheric pressure and the negative pressure applied to said air valve member, and wherein the biasing force of said first compression coil spring is smaller than the biasing force of said third compression coil spring.

5. A vacuum servo unit as claimed in claim 1, wherein said second contact portion is formed on said rod, and wherein said air valve member is slidably mounted on said rod to be engageable with said second contact portion formed on said rod.

6. A vacuum servo unit as claimed in claim 1, wherein said second contact portion is formed on the end portion of said plunger at the side thereof connected to said rod, and wherein said air valve member is slidably mounted on said plunger to be engageable with said second contact portion formed on said plunger.

7. A vacuum servo unit as claimed in claim 6, wherein a resilient boot is disposed between said air valve member and said rod for sealing the clearance therebetween air-tightly.

* * * * *